US005747632A

United States Patent [19]

Adachi et al.

[11] Patent Number: 5,747,632
[45] Date of Patent: May 5, 1998

[54] POLYCARBONATE RESIN WITH HIGH FLOWABILITY AND PROCESS FOR PRODUCING THE SAME

[75] Inventors: Takahiro Adachi; Toshiaki Takata, both of Osaka, Japan

[73] Assignee: Mitsubishi Gas Chemical Company, Inc., Tokyo, Japan

[21] Appl. No.: 744,315

[22] Filed: Nov. 7, 1996

[30] Foreign Application Priority Data

Nov. 27, 1995 [JP] Japan .................................. 7-307481

[51] Int. Cl.$^6$ .................................................. C08G 64/00
[52] U.S. Cl. ........................................... 528/196; 528/198
[58] Field of Search ................................. 528/196, 198

[56] References Cited

FOREIGN PATENT DOCUMENTS

| 60-215020 | 4/1984 | Japan . | |
| 61-123658 | 11/1984 | Japan . | |
| 60-215020 | 10/1985 | Japan | C08G 63/62 |
| 61-123658 | 6/1986 | Japan | C08L 69/00 |
| 63-278929 | 11/1988 | Japan | C08G 63/62 |
| 63-316313 | 12/1988 | Japan | G11B 5/704 |
| 1-146926 | 6/1989 | Japan | C08G 63/62 |
| 3-109420 | 5/1991 | Japan | C08G 64/24 |
| 4-306227 | 10/1992 | Japan | C08G 64/40 |
| 6-23243 | 3/1994 | Japan | C08G 64/20 |
| 6-336522 | 12/1994 | Japan | C08G 64/20 |
| 7-165899 | 6/1995 | Japan | C08G 64/20 |

*Primary Examiner*—Terressa Mosley
*Attorney, Agent, or Firm*—Sughrue, Mion, Zinn, Macpeak & Seas, PLLC

[57] ABSTRACT

Disclosed are a polycarbonate resin with high flowability having a viscosity average molecular weight (Mv) of 13,000 to 20,000 and containing below 1% by weight of low molecular weight carbonate compounds having the range of molecular weight 1,000 or below and at least 10% by weight of a polycarbonate oligomer having the range of molecular weight 2,000 to 5,000 and a process for producing the same.

9 Claims, No Drawings

POLYCARBONATE RESIN WITH HIGH FLOWABILITY AND PROCESS FOR PRODUCING THE SAME

BACKGROUND OF THE INVENTION

1) Field of the Invention

The present invention relates to a polycarbonate resin with high flowability and a process for producing the same, and more particularly to a polycarbonate resin with high flowability in which both molding transcription and cycle times-shortening ability suitable for the production of CD, LD, Read Only Memory (ROM) disk, Direct Read After Write (DRAW) disk, Erasable Direct Read After Write (E-DRAW) disk, etc. are excellent and furthermore the amount of stain on a stamper is small.

2) Prior Art

Polycarbonate resin is used as molding materials for optical parts such as materials for optical substrate, lenses, fibers, etc., since it has excellent optical characteristics and furthermore low equilibrium water absorption rate, excellent heat resistance, dimensional stability and mechanical characteristics such as impact strength, etc. Particularly, in optical information recording media, a high quality of polycarbonate resin is required from the aspects of prevention against stain on stamper during production of substrate, improvement of molding transcription, durability of recording layer, long time reliability of polycarbonate resin substrate per se, etc. For example, as described in Japanese Patent Kokai (Laid-open) Nos. 63-278929, 63-316313 and 1-146926, it has been suggested to reduce low molecular weight carbonate compounds and unreacted bisphenol.

However, even in the above-mentioned prior arts, it is still unsatisfactory to prevent stain on a stamper.

Further, as a method for reducing low molecular weight carbonate compounds being formed during polycondensation reaction, Japanese Patent Kokoku (Publication after examination) No. 6-23243 discloses a method for specializing a procedure for charging raw materials and a caustic alkali concentration in polymerization reaction. Japanese Patent Kokai (Laid-open) No. 3-109420 discloses a method for reducing a production amount of dimer of molecular weight modifier by using a tubular reactor in phosgenating reaction and adding the molecular weight modifier inside the tubular reactor or in its exit. However, in the above-mentioned methods, the content of low molecular weight carbonate compounds having the range of molecular weight 1,000 or below is not sufficiently reduced.

Japanese Patent Kokai (Laid-open) Nos. 6-336522 and 7-165899 describe the production of an aromatic polycarbonate having a low content of low molecular weight oligomers and a narrow molecular weight distribution. However, when an aromatic polycarbonate having a viscosity average molecular weight (Mv) of 13,000 to 20,000 is produced, low molecular weight carbonate compounds having the range of molecular weight 1,000 or below is not sufficiently reduced. Further the aromatic polycarbonate thus obtained has low flowability since the amount of produced oligomers to provide high flowability is very small, so that it is difficult to use it as the resin for optical recording medium.

Also a method for removing low molecular weight carbonate compounds, unreacted bisphenol and remained halogenated solvent in a purifying process has been suggested. For example, the methods for extracting the above-mentioned substances with acetone as a poor solvent for polycarbonate have been suggested (Japanese Patent Kokai (Laid-open) Nos. 63-278929 and 4-306227) However, the above-mentioned methods have such drawback that deterioration of flowability of molten resin itself is caused during molding since, in comparison with a case of not conducting extraction with acetone, not only low molecular weight compounds to stain on a stamper, but also polycarbonate oligomer contributing much to flowability is removed during production of substrate. Furthermore, in the methods, a slight amount of acetone remains in a product, i.e. pellets since extraction with acetone is conducted, so that thermal degradation such as lowering of molecular weight and coloration during molding occurs.

Further, as the optical information recording material, materials having high flowability during melting have been required in a disk injection molding from the viewpoints of reduction of birefringence and improvement of molding transcription and cycle times-shortening ability.

For example, as methods for improvement of flowability during melting, Japanese Patent Kokai (Laid-open) No. 60-215020 discloses that high flowability is provided by modifying terminal groups of polycarbonate to long chain alkyl groups and Japanese Patent Kokai (Laid-open) No. 61-123658 discloses that high flowability during melting is provided by adding oligomer to a polycarbonate resin. However, although improvement into materials with high flowability can be attained by modification of terminal groups or addition of oligomer, it is impossible to prevent stain on a stamper in the production of a substrate because low molecular weight carbonate compounds having a molecular weight of 1,000 or below are still present.

SUMMARY OF THE INVENTION

An object of the present invention is to solve the above-mentioned prior art problems without changing process of polycondensation reaction and raw materials in conventional methods and provide a molten polycarbonate resin with high flowability suitable for an optical recording medium in which the amounts of low molecular weight carbonate compounds, unreacted bisphenol, terminal OH group in the resin and terminal Cl group in the resin are small and a process for producing the same.

As a result of an extensive study for molten polycarbonate resin with high flowability in which both molding transcription and cycle times-shortening ability suitable for the production of an optical recording medium are excellent and the amounts of low molecular weight carbonate compounds, unreacted bisphenol, terminal OH group in the resin and terminal Cl group in the resin are small, the present inventors have found that a polycarbonate resin containing a specific amount of polycarbonate oligomer having specific range of molecular weight has excellent molding transcription and cycle times-shortening ability and less stain on a stamper and is useful as the resin for an optical recording medium.

That is, according to a first aspect of the present invention, there is provided a polycarbonate resin with high flowability having a viscosity average molecular weight (Mv) of 13,000 to 20,000 and containing below 1% by weight of low molecular weight carbonate compounds having the range of molecular weight 1,000 or below and at least 10% by weight of a polycarbonate oligomer having the range of molecular weight 2,000 to 5,000.

According to a second aspect of the present invention, there is provided a process for producing a polycarbonate resin with high flowability according to an interfacial polymerization method which comprises the steps of:

forming a reaction mixture while injecting phosgene into bisphenol, after the completion of injection of phosgene, adding a tetraammonium salt to the reaction mixture, then, conducting polycondensation reaction, after a viscosity average molecular weight (Mv) of the reaction mixture containing the resultant reaction products has reached to at least 6,000, adding a molecular weight modifier to the reaction mixture, further conducting polycondensation reaction, and thereby obtaining the polycarbonate resin.

DETAILED DESCRIPTION OF THE INVENTION

The present invention will be described in detail below.

(1) At the beginning, the first aspect of the present invention will be described below.

The polycarbonate resin with high flowability of the present invention (hereinafter, referred to as "the present polycarbonate resin") is a polycarbonate resin having a viscosity average molecular weight of 13,000 to 20,000 and containing below 1% by weight of low molecular weight carbonate compounds having the range of molecular weight 1,000 or below and at least 10% by weight of a polycarbonate oligomer having the range of molecular weight 2,000 to 5,000.

The present polycarbonate resin further comprises 30 ppm or below of unreacted bisphenol, 200 ppm or below of terminal OH group and 0.1 ppm or below of terminal Cl group.

The present polycarbonate resin has a low viscosity during melting and excellent cycle times-shortening ability and less stain on a stamper in the production of substrate by injection molding.

The viscosity average molecular weight (Mv), the molecular weight of low molecular weight carbonate compounds and the molecular weight of polycarbonate oligomer in the present invention are determined according to Gel Permeation Chromatography (hereinafter, referred to as "GPC"), respectively.

The low molecular weight carbonate compounds having the range of molecular weight 1,000 or below comprise, typically, dicarbonate compound as a condensation reaction product between dichloroformate of bisphenol produced by the reaction of bisphenol with phosgene and a molecular weight modifier, etc. When the content of the above-mentioned dicarbonate compound is above 0.2% by weight in the polycarbonate resin, it is not preferable even in case that the content of low molecular weight carbonate compounds having the range of molecular weight 1,000 or below is 1% by weight or below in the polycarbonate resin since stain on a stamper is caused in the production of substrate.

Further, when continuous injection molding of disk is conducted for a polycarbonate resin containing 1% by weight or above of low molecular weight carbonate compounds having the range of molecular weight 1,000 or below, both a mold and a stamper are contaminated with a slight amount of stain at a comparatively small number of molding shots, which result in cloudiness of a molded disk and failure of transcription of groove and pit. Thus, in such case, it is not preferable since exchange cycle of stamper must be shortened.

In the present invention, the content of the polycarbonate oligomer having the range of molecular weight 2,000 to 5,000 is at least 10% by weight and preferably 10 to 30% by weight. When the content of the polycarbo-nate oligomer is below 10% by weight, flowability of the molten polycarbonate resin deteriorates, whereas above 30% by weight it is not preferable since impact strength deteriorates due to lowering of viscosity average molecular weight(Mv) of the polycarbonate resin.

In order to use the present polycarbonate resin as optical disk substrate, it is necessary to reduce dusts inducing errors of signal in the polycarbonate resin. Specifically, the dusts contained much in aqueous phase must be removed by centrifugal separation etc., together with the aqueous phase from organic phase after the completion of polycondensation reaction. The organic phase thus obtained is filtered through a microfilter to remove further dusts and then solidified in the atmosphere shut off from the open air. The solidified resin is dried with a clean dryer. Thus, a powder polymer is obtained. Conventional additives, e.g., a stabilizer, a mold release, and if necessary, an ultraviolet absorber and a coloring agent, etc., are added to the polycarbonate resin thus obtained and thus pellets are formed by extruding formed.

The dusts of 0.5 to 1.0 μm diameter contained in the pellets must be reduced to 40,000 pieces/g or below.

The optical recording medium produced from the present polycarbonate resin provides less signal noises and has excellent heat deflection resistance, impact strength and long-time reliability.

(2) Next, the second aspect of the present invention will described below.

The most important feature in the process for producing a polycarbonate resin of the present invention (hereinafter, referred to as "the present process") according to an interfacial polymerization method is in that a reaction mixture is formed while injecting phosgene in bisphenol and after the completion of injection of phosgene, i.e., at the step of polycarbonate precursor (dichloroformate) produced by the phosgenating reaction of bisphenol with phosgene, a tetraammonium salt is added to the reaction mixture and then after a viscosity average molecular weight (Mv) of the reaction mixture containing the resultant reaction products has reached to at least 6,000, a molecular weight modifier is added to the reaction mixture and polycondensation is further conducted.

In the polycarbonate resin thus obtained, the content of low molecular weight carbonate compounds having the range of molecular weight 1,000 or below is small as below 1% by weight and the content of polycarbonate oligomer having the range of molecular weight 2,000 to 5,000 is 10 to 30% by weight and the viscosity average molecular weight (Mv) of the polycarbonate resin is in the range of 13,000 to 20,000. Thus, the polycarbonate resin containing a very small amount of low molecular weight carbonate compounds having the range of molecular weight 1,000 or below and polycarbonate oligomer having particular molecular weight has excellent molding transcription and cycle times-shortening ability suitable for the production of an optical recording medium and further-more excellent flowability, causing less stain on a stamper.

Examples of bisphenols as a raw material of the present polycarbonate resin include bis (4-hydroxyphenyl) methane, bis(4-hydroxyphenyl) ether, bis (4-hydroxyphenyl) sulfone, bis(4-hydroxyphenyl) sulfoxide, bis(4-hydroxyphenyl) sulfide, bis(4-hydroxyphenyl) ketone, 1,1-bis(4-hydroxyphenyl) ethane, 2,2-bis (4-hydroxyphenyl) propane (bisphenol A; BPA), 2,2-bis (4-hydroxyphenyl) butane, 1,1-bis(4-hydroxyphenyl) cyclohexane (bisphenol Z; BPZ), 2,2-bis(4-hydroxy-3, 5-dibromophenyl) propane, 2,2-bis(4-hydroxy-3,5-dichlorophenyl) propane, 2,2-bis(4-hydroxy-3- bromophenyl) propane, 2,2-bis(4-hydroxy-3-chlorophenyl) propane, 2, 2-bis(4-hydroxy-3-methylphenyl)propane, 2,2-bis(4-hydroxy-3, 5-dimethylphenyl) propane, 1,1-bis(4-hydroxyphenyl)-1-phenylethane, bis(4-hydroxyphenyl) diphenylmethane, α,ω-bis [3-(o-hydroxyphenyl) propyl] polydimethylsiloxane, etc., and a mixture of at least two species thereof, among which bisphenol A is particularly preferable.

Phosgene is used usually in the range of 100 to 120 mol and preferably in the range of 105 to 115 mol per 100 mol of bisphenol. In the present invention, carbonyl chloride called phosgene is preferably used. Halogenated carbonyl except chlorine also may be used.

The injection time of phosgene is usually 10 to 120 minutes and preferably 15 to 60 minutes.

A base is usually used in the reaction of bisphenol with phosgene. As the base, alkali metal compounds such as sodium hydroxide, potassium hydroxide, alkaline earth metal compounds, etc., are used. The equivalent ratio of bisphenol to the base is preferably 1:1.1 to 1.6. Such base is usually used in the form of an aqueous solution. The concentration of base in the aqueous solution is usually 6 to 10% by weight/volume.

The water used herein is distilled water, ion exchange water or water recovered in the production of polycarbonate, etc.. In order to inhibit both oxidation and coloring of bisphenol, sodium sulfite, sodium hydrosulfite or sodium borohydride can be used in the reaction.

The present process is usually conducted in a batch reaction. Although the total amount of base to be used may be initially charged in the batch reaction, it is preferable to charge initially 70 to 95% of the total base being used and then add 2 to 27% of the total base at the time of addition of tetraammonium salt and further add 3 to 28% of the total base at the time of addition of molecular weight modifier.

In order to conduct readily phosegnating reaction and polycondensation reaction, organic solvents are used. The solvents are insoluble in water and inert for the reaction and furthermore compounds capable of dissolving polycarbonate produced by the reaction. Examples of the solvents include chlorinated aliphatic hydrocarbons such as methylene chloride, tetrachloroethane, chloroform, 1,2-dichloroethylene, carbon tetrachloride, trichloroethane, dichloroethan, etc.; chlorinated aromatic hydrocarbones such as chlorobenzene, dichlorobenzene, chlorotoluene, etc.; acetophenone, cyclohexane, anisole, etc., and a mixture thereof, among which methylene chloride is most preferable. 0.1 to 1 l of the above-mentioned solvents per 1 mol of bisphenol is used.

Examples of tetraammonium salt to be added after the completion of injection of phosgene include tetramethylammonium chloride, triethylbenzylammonium chloride, triethylbenzylammonium chloride, tetraethylammonium bromide, tetra-n-butylammonium iodide, etc., among which trimethylbenzylammonium chloride and triethylbenzylammonium chloride are preferable. Usually, 0.005 to 50 millimol of tetraammonium salt per 1 mol of bisphenol is used.

The tetraammonium salt is added in the form of an aqueous solution so as to disperse sufficiently over all the reaction system. The concentration of tetraammonium salt in the aqueous solution is preferably 5 to 20% by weight/volume. The aqueous solution is added to the reaction mixture solution, preferably together with a base, after the completion of injection of phosgene.

The time at which a viscosity average molecular weight (Mv) of the reaction mixture reaches to at least 6,000 after the addition of tetraammonium salt is 5 to 30 minutes, depending upon the reaction temperature and stirring conditions.

According to the present invention, the formation of the low molecular weight carbonate compounds having a molecular weight of 1,000 or below which are present in the final polymer is suppressed and the content of the polycarbonate oligomer having a molecular weight of 2,000 to 5,000 is adjusted to 10 to 30% by weight, by adding tetraammonium salt to polycarbonate precursor before adding a molecular weight modifier and furthermore adding a molecular weight modifier after a viscosity average molecular weight of the reaction mixture has reached to at least 6,000 and conducting polycondensation reaction.

Examples of the molecular weight modifier in the present invention include monohydric substituted phenols such as conventional phenols, p-tertiary butyl phenol, tribromophenols, etc., long chain alkyl phenols, aliphatic carboxylic acid chloride, aliphatic carboxylic acid, hydroxybenzoic acid alkylester, hydroxyphenylalkyl acid ester, alkylether phenol, etc., and a mixture of at least two species thereof. Usually, 0.03 to 0.1 mol of the molecular weight modifier per 1 mol of bisphenol is used.

The viscosity average molecular weight (Mv) of product is decided depending upon the amount of the molecular weight modifier to be added. In contrast to the process in which a molecular weight modifier is added after the completion of injection of phosgene to conduct the polycondensation reaction, as shown in the present process, a tetraammonium salt is added after the completion of injection of phosgene and then after a viscosity average molecular weight (Mv) of the reaction mixture has reached to at least 6,000, a molecular weight modifier is added, whereby a polycarbonate resin with high flowability for an optical recording medium having the same viscosity average molecular weight (Mv) as in the former process in an amount of the molecular weight modifier of 95 to 99% by weight to that to be usually required, can be produced. It is assumed that the molecular weight modifier to react with high molecular weight dichloroformate compound is increased since the molecular weight modifier to react with low molecular weight dichloroformate has decreased, so that it becomes possible to adjust its viscosity average molecular weight (Mv) to intended viscosity average molecular weight (Mv) by use of a slightly less amount of the molecular weight modifier than that to be usually required.

Regarding the timing of addition of the molecular weight modifier in the present invention, it is important to add it after a viscosity average molecular weight (Mv) of the reaction mixture has reached to at least 6,000.

The base to be again added together with the molecular weight modifier in the present invention is important to conduct completely condensation reaction of the molecular weight modifier with terminal chloroformate in the resin. When the alkali concentration in the reaction solution is too high before the addition of the molecular weight modifier, it is difficult to control the molecular weight and intended polymer cannot be obtained since the reaction between terminal Cl group in the resin and the base often occurs, so that terminal OH group in the resin is formed. Further, when no base is added together with the molecular weight modifier, there occurs the disadvantage that the reaction with the molecular weight modifier is delayed and thus the molecular weight of polymer becomes too large.

It is preferable that both a base and a polymerization catalyst are added together at the time of addition of the above-mentioned molecular weight modifier. Further, after the addition of the molecular weight modifier to the reaction mixture, the polymerization is completed while stirring for 30 to 120 minutes.

Examples of the above-mentioned polymerization catalyst include tertiary amines such as triethylamine, tertiary phosphine, tetraphosphonium salts, nitrogen-containing heterocyclic compounds and salts thereof, imino ethers and salts thereof, and compounds having an amido group(s), among which tertiary amines such as triethylamine are preferable. 0.1 to 10 millimol of the polymerization catalyst per 1 mol of charged bisphenol is added.

The present polycarbonate resin is usually produced by batch wise. As the production apparatus in batch wise, a reactor with a jacket, provided with a stirring apparatus, a gas injection tube and a condenser is used. The stirring apparatus is not limited and an inversion type stirrer is preferable.

It is preferable that the inversion rate is 70 to 200 times/minute during injection of phosgene, 90 to 250 times/minute from the addition of tetraammonium salt to the addition of the molecular weight modifier and 70 to 230 times/minute from the addition of the molecular weight modifier to the completion of the reaction.

It is preferable that the reaction temperature is 10° to 25° C. during injection of phosgene, 20° to 25° C. from the addition of tetraammonium salt to the addition of the molecular weight modifier and 20° to 35° C. from the addition of the molecular weight modifier to the completion of the reaction.

DESCRIPTION OF THE PREFERRED EMBODIMENTS

The present invention will be described in more detail below, referring to Examples, which are not intended to limit the scope of the present invention.

Each properties were measured according to the following methods.

[Viscosity average molecular weight (Mv)]

The measurement [1] [2] [3] of molecular weight (Mi) of molecule i as conversion value to polystyrene and peak area of molecule of the degree of polymerization i was made by using GPC made by Waters Co., Limited (column; Ultrastyragel $10^5+10^4+10^3+500$Å, made by Waters Co., Limited), ten polystyrenes having each peak molecular weight (Mp) of 680, 1680, 2950, 11600, 28500, 66000, 156000, 560000, 1290000 and 2880000 (Polystyrene-Medium Molecular Weight Calibration Kit, Part No.2010-0100, produced by Polymer Laboratories Inc., USA) as the standard polymers and tetrahydrofuran as the solvent.
Note:

1) J. Polym. Sci., Part B, 5, 753 (1974), Z. Grubisic, P. Rempp, H. Benoit

2) J. Polym. Lett. Ed., 12, 331 (1974), E. P. Otocka, M. Y. Hellman

3) "Polycarbonate Resin Handbook", published by Nikkan Kogyo Shinbun Sha, Japan, editor S. Honma, P55–57, Aug.28, 1992.

The viscosity average molecular weight (Mv) was calculated from both the molecular weight (Mi) and peak area thus obtained.

(Number average molecular weight)
$$Mn = \frac{\Sigma(NiMi)}{\Sigma Ni}$$

(Weight average molecular weight)
$$Mw = \frac{\Sigma(NiMi^2)}{\Sigma(NiMi)}$$

-continued
(Viscosity average molecular weight)
$$Mv = \left( \frac{\Sigma(NiMi^{1.70})}{\Sigma(NiMi)} \right)^{1/0.70}$$

Mi: molecular weight of molecule of the degree of polymerization i measured by the above-mentioned GPC.

Ni: the number of molecule of the degree of polymerization i having molecular weight Mi.

MiNi corresponds to peak area of molecule of the degree of polymerization i measured by the above-mentioned GPC.

[Molecular weight of low molecular weight carbonate compounds and molecular weight distribution of polycarbonate oligomer]

The measurement of each molecular weight (Mi) of low molecular weight carbonate compounds as conversion value to polystyrene and molecular weight (Mi) distribution of carbonate oligomer as conversion value to polystyrene was made by using the same GPC, standard polymers and solvent as in the foregoing paragraph.

[Each content of low molecular weight carbonate compounds and polycarbonate oligomer]

Each contents was determined from each peak area of low molecular weight carbonate compound having the range of molecular weight 1,000 or below as conversion value to polystyrene and polycarbonate oligomer having the range of molecular weight 2,000 to 5,000 as conversion value to polystyrene per total peak area by using the above-mentioned GPC.

[Content of unreacted bisphenol]

The content was determined from peak area of bisphenol (BPA) per total peak area by using the above-mentioned GPC.

[Content of dicarbonate compound in polymer]

The measurement was made by using Liquid Chromatography (hereinafter referred to as "LC"), made by Waters Co., Limited (column; K803L×2, made by Shodex Co., Limited). The monomer content was determined from peak area of dicarbonate compound per total peak area.

[Terminal chloroformate group content in resin converted to chlorine concentration (terminal Cl group content)]

The measurement was made with a spectrophotometer according to a colorimetry method.

[Teterminal phenolic hydroxy group content in resin (terminal OH group content)]

The measurement was made with a spectrophotometer according to a colorimetry method.

[Flow value showing flowability of resin]

The flow value corresponds to a melt viscosity measured with a flow testing machine and is shown by a quantity of melted resin flowing out through a nozzle of diameter 1 mm and length 10 mm at 280° C. under a pressure of 160 kgf/cm$^2$, which is represented by the unit of ml/sec. The flow value increases with decrease of melt viscosity.

[Observation of stain on stamper]

A disk of outer diameter 120 mm and thickness 1.2 mm was continuous 5,000 shots injection-molded (an injection molding machine, made by Sumitomo Juki Kogyo K. K., Japan; Neomat 350/120 provided with SYCAP) with a compact disk mold at a resin temperature of 340° C. and a mold temperature of 90° C. under a injection pressure of 1,000 kgf/cm$^2$ and a retention pressure of 300 kgf/cm$^2$. Then, stain on stamper after molding were observed with an atomic force microscope.

EXAMPLE 1

7.00 kg (31 mol) of 2,2-bis (4-hydroxyphenyl) propane (BPA) and 20 g of sodium hydrosulfite were dissolved in 34

1 of 8.8% (w/v) aqueous sodium hydroxide solution in a glass-lining reactor with a jacket of capacity 100 l provided with an inversion type stirrer, a gas injection tube and a condenser.

Then, 11 l of methylene chloride was added thereto and 3.3 kg of phosgene was injected over 30 minutes with stirring at an inversion rate of 180 times/minute while keeping the solution at 15° C.

After the completion of injection of phosgene, 50 ml (0.026 mol) of 12% (w/v) aqueous triethylbenzilanmmonium chloride solution, 2 l of 8.8% (w/v) aqueous sodium hydroxide solution and 9 l of methylene chloride were added thereto and the resultant reaction mixture solution was stirred for 15 minutes at an inversion rate of 210 times/ minute while keeping the reaction mixture solution at 21° C. Since a viscosity average molecular weight (Mv) of the reaction mixture has reached to 11,600, 0.27 kg (1.8 mol) of p-t-butylphenol, 3 l of 8.8% (w/v) aqueous sodium hydroxide solution and 0.043 mol of triethylamine were added thereto and the polymerization was conducted for about one hour with stirring at an inversion rate of 200 times/minute while keeping the reaction mixture solution at 21° C.

The resulting polymerization solution was separated into an aqueous phase and an organic phase. The organic phase was neutralized with phosphoric acid and repeatedly washed with pure water until the pH of washing water became neutral and then filtered through a microfilter. 47 l of isopropanol was added to the organic phase to precipitate the polymer. Then, the precipitates were recovered therefrom by filtration and dried with a clean drying machine, whereby a powdery polymer was obtained.

As a result of analysis by GPC, the viscosity average molecular weight (Mv) of the polymer thus obtained was 15,400. According to a colorimetry method, terminal phenolic OH group content was 100 ppm and terminal Cl group content was 0.05 ppm. As a result of analysis by GPC and LC, the polymer contained 20 ppm or below of BPA, 12.6% by weight of polycarbonate oligomers having the range of molecular weight 2,000 to 5,000, 0.74% by weight of low molecular weight carbonate compounds having the range of molecular weight 1,000 or below and 0.12% by weight of dicarbonate compound.

0.03% by weight of stearic acid monoglyceride was added to the powdery polymer thus obtained. Then, the mixture thus obtained was pelletized with a vent-type, biaxial extruder of L/D=28 at a resin temperature of 270° C. The pellets thus obtained were dried with a clean drying machine at 120° C. for 4 hours and then continuous 5,000 shots injection molding of a compact disk having an outer diameter of 120 mm and a thickness of 1.2 mm was conducted for the dried pellets with a disk molding machine at a resin temperature of 340° C. and a mold temperature of 90° C. The stain on the stamper after molding was observed with an atomic force microscope.

The results are shown in Table 1.

EXAMPLE 2

7.00 kg (31 mol) of 2,2-bis (4-hydroxyphenyl) propane (BPA) and 20 g of sodium hydrosulfite were dissolved in 34 l of 8.8% (w/v) aqueous sodium hydroxide solution in a glass-lining reactor with a jacket of capacity 100 l provided with an inversion type stirrer, a gas injection tube and a condenser.

Then, 11 l of methylene chloride was added thereto and 3.3 kg of phosgene was injected over 30 minutes with stirring at an inversion rate of 180 times/minute while keeping the solution at 15° C.

After the completion of injection of phosgene, 50 ml (0.026 mol) of 12% (w/v) aqueous triethylbenzilanmmonium chloride solution, 2 l of 8.8% (w/v) aqueous sodium hydroxide solution and 9 l of methylene chloride were added thereto and the resultant reaction mixture solution was stirred for 10 minutes at an inversion rate of 210 times/ minute while keeping the reaction mixture solution at 21° C. Since a viscosity average molecular weight (Mv) of the reaction mixture has reached to 6,900, 0.27 kg (1.8 mol) of p-t-butylphenol, 3 l of 8.8% (w/v) aqueous sodium hydroxide solution and 0.043 mol of triethylamine were added thereto and the polymerization was conducted for about one hour with stirring at an inversion rate of 200 times/minute while keeping the reaction mixture solution at 21° C.

A powdery polymer was obtained in the manner as in Example 1

As a result of analysis by GPC, the viscosity average molecular weight (Mv) of the polymer thus obtained was 15,800. According to a colorimetry method, terminal phenolic OH group content was 120 ppm and terminal Cl group content was 0.03 ppm. As a result of analysis by GPC and LC, the polymer contained 20 ppm or below of BPA, 10.7% by weight of polycarbonate oligomers having the range of molecular weight 2,000 to 5,000, 0.97% by weight of low molecular weight carbonate compounds having the range of molecular weight 1,000 or below and 0.16% by weight of dicarbonate compound.

The stain on the stamper after molding was observed in the same manner as in Example 1.

The results are shown in Table 1.

EXAMPLE 3

7.00 kg (31 mol) of 2,2-bis (4-hydroxyphenyl) propane (BPA) and 20 g of sodium hydrosulfite were dissolved in 34 l of 8.8% (w/v) aqueous sodium hydroxide solution in a glass-lining reactor with a jacket of capacity 100 l provided with an inversion type stirrer, a gas injection tube and a condenser.

Then, 11 l of methylene chloride was added thereto and 3.3 kg of phosgene was injected over 30 minutes with stirring at an inversion rate of 180 times/minute while keeping the solution at 15° C.

After the completion of injection of phosgene, 50 ml (0.026 mol) of 12% (w/v) aqueous triethylbenzilammonium chloride solution, 2 l of 8.8% (w/v) aqueous sodium hydroxide solution and 9 l of methylene chloride were added thereto and the resultant reaction mixture solution was stirred for 15 minutes at an inversion rate of 210 times/ minute while keeping the reaction mixture solution at 22° C. Since a viscosity average molecular weight (Mv) of the reaction mixture has reached to 12,400, 0.285 kg (1.9 mol) of p-t-butylphenol, 3 l of 8.8% (w/v) aqueous sodium hydroxide solution and 0.043 mol of triethylamine were added thereto and the polymerization was conducted for about one hour with stirring at an inversion rate of 200 times/minute while keeping the reaction mixture solution at 21° C.

A powdery polymer was obtained in the manner as in Example 1.

As a result of analysis by GPC, the viscosity average molecular weight (Mv) of the polymer thus obtained was 14,700. According to a colorimetry method, terminal phenolic OH group content was 110 ppm and terminal Cl group content was 0.05 ppm. As a result of analysis by GPC and LC, the polymer contained 20 ppm or below of BPA, 13.4% by weight of polycarbonate oligomers having the range of molecular weight 2,000 to 5,000, 0.82% by weight of low molecular weight carbonate compounds having the range of molecular weight 1,000 or below and 0.14% by weight of dicarbonate compound.

The stain on the stamper after molding was observed in the same manner as in Example 1.

The results are shown in Table 1.

COMPARATIVE EXAMPLE 1

7.00 kg (31 mol) of 2,2-bis (4-hydroxyphenyl) propane (BPA) and 20 g of sodium hydrosulfite were dissolved in 34 l of 8.8% (w/v) aqueous sodium hydroxide solution in a glass-lining reactor with a jacket of capacity 100 l provided with an inversion type stirrer, a gas injection tube and a condenser.

Then, 11 l of methylene chloride was added thereto and 3.3 kg of phosgene was injected over 30 minutes with stirring at an inversion rate of 180 times/minute while keeping the solution at 15° C.

After the completion of injection of phosgene, 0.29 kg (2.0 mol) of p-t-butylphenol, 5 l of 8.8% (w/v) aqueous sodium hydroxide solution and 9 l of methylene chloride were added thereto and the resultant reaction mixture solution was stirred for 20 minutes at an inversion rate of 210 times/minute while keeping the reaction mixture solution at 22° C. Then, 0.043 mol of triethylamine were added thereto and the polymerization was conducted for about one hour with stirring at an inversion rate of 200 times/minute while keeping the reaction mixture solution at 21° C. A powdery polymer was obtained in the same manner as in Example 1.

As a result of analysis by GPC, the viscosity average molecular weight (Mv) of the polymer thus obtained was 15,400. According to a colorimetry method, terminal phenolic OH group content was 170 ppm and terminal Cl group content was 0.05 ppm. As a result of analysis by GPC and LC, the polymer contained 20 ppm or below of BPA, 9.2% by weight of polycarbonate oligomers having the range of molecular weight 2,000 to 5,000, 1.45% by weight of low molecular weight carbonate compounds having the range of molecular weight 1,000 or below and 0.46% by weight of dicarbonate compound.

The stain on the stamper after molding was observed in the same manner as in Example 1.

The measured or observed results of flow value, content of polycarbonate oligomer having the range of molecular weight 2,000 to 5,000, content of low molecular weight carbonate compounds having the range of molecular weight 1,000 or below, content of dicarbonate compound and the stain on the stamper after continuous 5,000 shots injection molding of disk were shown in table 1.

As shown in table 1, in the resins in Examples 1 to 3, flowability during melting did not deteriorate and flow value was $38 \times 10^{-2}$ cc/sec or above and cycle times-shortening ability was excellent and no stain on stamper was observed.

The polycarbonate resin of the present invention contains a very small amount of low molecular weight carbonate compounds and has high flowability, excellent molding transcription and cycle times-shortening ability and less stain on a stamper and is a resin for an optical recording medium useful for MO disk, digital video disk, etc.

TABLE 1

| Example and Comp. Ex. | Flow value ($\times 10^{-2}$ ml/sec) | Polycarbonate oligomer content M.W. 2,000–5,000 (wt. %) | Carbonate compounds content M.W. 1,000 or below (wt. %) | Dicarbonate compound content (wt. %) | Stain on the stamper |
|---|---|---|---|---|---|
| Example |  |  |  |  |  |
| 1 | 39 | 12.6 | 0.74 | 0.12 | o Ẋ |
| 2 | 38 | 10.7 | 0.97 | 0.16 | o Ẋ |
| 3 | 46 | 13.4 | 0.82 | 0.14 | o Ẋ |
| Comp. Ex. 1 | 39 | 9.2 | 1.45 | 0.46 | x Ẋ |

Ẋ Note
o: no stain existed
x: stain existed

What is claimed is:

1. A polycarbonate resin with high flowability having a viscosity average molecular weight (Mv) of 13,000 to 20,000 and containing less than 1% by weight of low molecular weight carbonate compounds having a molecular weight of 1,000 or less and at least 10% by weight of a polycarbonate oligomer having a molecular weight in the range of 2,000 to 5,000.

2. A polycarbonate resin according to claim 1, wherein the polycarbonate resin contains 10% to 30% by weight of the polycarbonate oligomer.

3. A polycarbonate resin according to claim 1, wherein a content of a dicarbonate compound contained in the low molecular weight carbonate compounds is 0.2% by weight or less to the polycarbonate resin.

4. A polycarbonate resin according to claim 1 formed by an interfacial polymerization method comprising the steps of:

forming a reaction mixture while injecting phosgene into bisphenol, completing the injection of phosgene and then adding a tetraammonium salt to the reaction mixture, then-conducting polycondensation reaction, after a viscosity average molecular weight (Mv) of the reaction mixture containing reaction products of the polycondensation reaction has reached at least 6,000, adding a molecular weight modifier to the reaction mixture, and further conducting polycondensation reaction, to thereby obtain the polycarbonate resin.

5. A polycarbonate resin according to claim 4, wherein after the viscosity average molecular weight (Mv) of the reaction mixture containing the reaction products of the polycondensation reaction has reached at least 6,000 both a molecular weight modifier and a base are added to the reaction mixture, whereafter the polycondensation reaction is further conducted to thereby obtaining the polycarbonate resin.

6. A polycarbonate resin according to claim 4, wherein at the time of adding the tetraammonium salt, a base is added together with the tetraamonium salt.

7. A polycarbonate resin according to claim 4, wherein after the viscosity average molecular weight (Mv) of the reaction mixture containing the reaction products of the polycondensation reaction has reached at least 6,000, a molecular weight modifier, a base and a polymerization catalyst are added to the reaction mixture, and the polycondensation reaction is further conducted to thereby obtaining the polycarbonate resin.

8. A polycarbonate resin according to claim 4, wherein the bisphenol is 2,2-bis (4-hydroxyphenyl) propane.

9. A polycarbonate resin according to claim 4, wherein the tetraammonium salt is selected from the group consisting of trimethylbenzylammonium chloride and triethylbenzylammonium chloride.

* * * * *